US012033560B2

(12) United States Patent
Shan

(10) Patent No.: US 12,033,560 B2
(45) Date of Patent: Jul. 9, 2024

(54) MULTIPLEXING DRIVING METHOD, MULTIPLEXING DRIVING MODULE AND DISPLAY DEVICE

(71) Applicants: Chengdu BOE Optoelectronics Technology Co., Ltd., Sichuan (CN); BOE Technology Group Co., Ltd., Beijing (CN)

(72) Inventor: Dongxiao Shan, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/761,540

(22) PCT Filed: Mar. 10, 2021

(86) PCT No.: PCT/CN2021/079858
§ 371 (c)(1),
(2) Date: Mar. 17, 2022

(87) PCT Pub. No.: WO2021/213043
PCT Pub. Date: Oct. 28, 2021

(65) Prior Publication Data

US 2022/0383798 A1 Dec. 1, 2022

(30) Foreign Application Priority Data

Apr. 21, 2020 (CN) ........................ 202010316430.X

(51) Int. Cl.
*G09G 3/20* (2006.01)

(52) U.S. Cl.
CPC ... *G09G 3/2092* (2013.01); *G09G 2310/0297* (2013.01)

(58) Field of Classification Search
CPC ......... G09G 3/2092; G09G 2310/0297; G09G 2300/0819; G09G 2300/0842;
(Continued)

(56) References Cited

U.S. PATENT DOCUMENTS 8,305,374 B2 * 11/2012 Lee ...................... G09G 3/3648 345/215
8,907,993 B2 * 12/2014 Komatsu .............. G09G 3/3688 345/98

(Continued)

FOREIGN PATENT DOCUMENTS

CN 105741735 A 7/2016
CN 106292096 A 1/2017

(Continued)

OTHER PUBLICATIONS

PCT/CN2021/079858 international search report and written opinion.

*Primary Examiner* — Jose R Soto Lopez
(74) *Attorney, Agent, or Firm* — IPro, PLLC

(57) ABSTRACT

A multiplexing driving method includes: within an initial time period, applying, by a source driver, an initial voltage to a pre-charging multiplexing switch; within a first charging time period, controlling different non-pre-charging multiplexing switches to be turned on in a time-division manner, so as to write a corresponding grey-scale voltage into corresponding non-pre-charging data lines in a time-division manner via the turned-on non-pre-charging multiplexing switches; and within a second charging time period, controlling, by the gate driving circuit, a corresponding gate line to be turned on; controlling different pre-charging multiplexing switches to be turned on in a time-division manner; and applying, by the source driver, a corresponding grey-scale voltage to the pre-charging multiplexing switches to write the corresponding grey-scale voltage to pixel circuits (Continued)

in a row corresponding to the gate line and electrically connected to the corresponding pre-charging data lines respectively in a time-division manner.

20 Claims, 5 Drawing Sheets

(58) Field of Classification Search
CPC ......... G09G 2300/0861; G09G 3/3291; G09G 2310/0248; G09G 2310/0251; G09G 3/3233; G09G 3/20
See application file for complete search history.

(56) References Cited

U.S. PATENT DOCUMENTS

| | | | | |
|---|---|---|---|---|
| 2006/0158413 A1* | 7/2006 | Morita | G09G 3/3655 | 345/94 |
| 2007/0296651 A1* | 12/2007 | Kim | G09G 3/3233 | 345/76 |
| 2012/0229524 A1* | 9/2012 | Toshima | G09G 3/3648 | 345/89 |
| 2013/0083093 A1* | 4/2013 | Kim | G09G 3/3258 | 345/212 |
| 2016/0189600 A1 | 6/2016 | Shin et al. | | |
| 2017/0236487 A1* | 8/2017 | Guo | G09G 3/20 | 345/211 |
| 2020/0027414 A1* | 1/2020 | Aoki | G09G 3/3614 | |
| 2020/0051480 A1* | 2/2020 | Chang | G09G 3/20 | |
| 2021/0327322 A1* | 10/2021 | Ito | G09G 3/20 | |
| 2022/0208129 A1* | 6/2022 | Yoo | G09G 3/3258 | |
| 2022/0262320 A1* | 8/2022 | Chang | G09G 3/3291 | |

FOREIGN PATENT DOCUMENTS

| | | | |
|---|---|---|---|
| CN | 108428433 | A | 8/2018 |
| CN | 110599941 | A | 12/2019 |
| CN | 110955091 | A | 4/2020 |
| CN | 111477148 | A | 7/2020 |

* cited by examiner

MULTIPLEXING DRIVING METHOD, MULTIPLEXING DRIVING MODULE AND DISPLAY DEVICE

CROSS-REFERENCE TO RELATED APPLICATIONS

This application is the U.S. national phase of PCT Application No. PCT/CN2021/079858 filed on Mar. 10, 2021, which claims priority Chinese Patent Application No. 202010316430. X, filed in China on Apr. 21, 2020, which is incorporated herein by reference in its entirety.

TECHNICAL FIELD

The present disclosure relates to the field of display technology, in particular to a multiplexing driving method, a multiplexing driving module and a display device.

BACKGROUND

In a first multiplexing driving manner in the related art, when a source driver outputs a voltage, in a case that a gate line is turned on, an extreme value of a voltage from the source driver may be recorded in a pixel storage capacitor of a pixel circuit. In a case that the voltage from the source driver is not stable yet when turning on a multiplexing switch in a multiplexing sub-circuit of a multiplexing circuit, it is impossible to write a subsequent stable grey-scale voltage into the pixel storage capacitor, and thus the chromatic aberration occurs.

In a second multiplexing driving manner in the related art, in the case that the source driver is multiplexed to a large extent (namely, grey-scale voltage is applied to a plurality of data lines via one multiplexing sub-circuit in a time-division manner), due to a large TFT (thin film transistor) resistance, the passive charging mode has a slow charging speed and low charging rate. The passive charging mode is described as follows. The grey-scale voltage is written into data lines in a time division manner when the gate line is turned off. Next, the gate line is turned on, and the grey-scale voltage is written into the pixel circuits. When the gate line is turned on, it is actually that the parasitic capacitance of each data line charges the pixel storage capacitance in each pixel circuit. When the gate line is turned on; the multiplexing switch needs to be turned off, it is unable for the source driver to drive any pixel, which is time consuming and has a low utilization rate of the source driver.

In the second multiplexing driving manner in the related art, all multiplexing switches in a multiplexing sub-circuit are controlled to be turned on, an initial voltage is written into all data lines electrically connected to the multiplexing sub-circuit. Within a second charging time period, a corresponding gate line is turned on, a pixel storage capacitor in a pixel circuit in a corresponding row and corresponding column is charged via the initial voltage, and then a grey-scale voltage from a source driver is applied to the pixel storage capacitor in the pixel circuit in the corresponding row and corresponding column via the multiplexing switch. A charging process and a discharging process are performed in a repeated manner via the initial voltage and the grey-scale voltage, resulting in a relatively high power consumption.

SUMMARY

In one aspect, the present disclosure provides in some embodiments a multiplexing driving method for a display module. The display module includes a source driver, a gate driving circuit, a multiplexing circuit and a pixel circuit, pixel circuits in a same row are electrically connected to a same gate line, and pixel circuits in a same column are electrically connected to a same data line. The multiplexing circuit includes at least one multiplexing sub-circuit including a plurality of multiplexing switches, a control end of each multiplexing switch in a same multiplexing sub-circuit is electrically connected to a multiplexing control end, a first end of the multiplexing switch is electrically connected to the source driver, a second end of the multiplexing switch is electrically connected to a corresponding data line, and a driving period includes an initial time period, a first charging time period and a second charging time period arranged one after another. In the multiplexing sub-circuit, at least one multiplexing switch serves as a pre-charging multiplexing switch, and the multiplexing control end electrically connected to a control end of the pre-charging multiplexing switch is a pre-charging multiplexing control end. In the multiplexing sub-circuit, the multiplexing switches other than the at least one pre-charging multiplexing switch are non-pre-charging multiplexing switches, and the multiplexing control end electrically connected to a control end of each non-pre-charging multiplexing switch is a non-pre-charging multiplexing control end. The data line electrically connected to the pre-charging multiplexing switch is a pre-charging data line, and the data line electrically connected to each non-pre-charging multiplexing switch is a non-pre-charging data line. The multiplexing driving method includes: within the initial time period, applying an on control signal to the pre-charging multiplexing control end to turn on the pre-charging multiplexing switch, and applying, by the source driver, an initial voltage to the pre-charging multiplexing switch to write the initial voltage into the corresponding pre-charging data line via the turned-on pre-charging multiplexing switch; within the first charging time period, applying an on control signal to different non-pre-charging multiplexing control ends in a time-division manner to turn on the different non-pre-charging multiplexing switches in the time-division manner; and applying, by the source driver, a corresponding grey-scale voltage to the non-pre-charging multiplexing switches to write the corresponding grey-scale voltage into corresponding non-pre-charging data lines in a time-division manner via the turned-on non-pre-charging multiplexing switches; and within the second charging time period, controlling, by the gate driving circuit, a corresponding gate line to be turned on, to write the corresponding grey-scale voltage into the pixel circuits in a row corresponding to the gate line and electrically connected to the corresponding non-pre-charging data lines respectively; applying an on control signal to different pre-charging multiplexing control ends in a time-division manner to turn on the different pre-charging multiplexing switches in the time-division manner; applying, by the source driver, a corresponding grey-scale voltage to the pre-charging multiplexing switches to write the corresponding grey-scale voltage to the pixel circuits in a row corresponding to the gate line and electrically connected to the corresponding pre-charging data lines respectively in a time-division manner via the turned-on pre-charging multiplexing switches. Each corresponding pre-charging data line is electrically connected to the turned-on pre-charging multiplexing switch.

In a possible embodiment of the present disclosure, the pixel circuits corresponding to a same color are each electrically connected to the pre-charging multiplexing switch or a non-pre-charging multiplexing switch.

In a possible embodiment of the present disclosure, the second charging time period includes a pre-charging stage and N second charging stages arranged one after another, and the multiplexing driving method further includes: at the pre-charging stage, controlling, by the gate driving circuit, the corresponding gate line to be turned on, to write the initial voltage to the pixel circuits in the row corresponding to the gate line and electrically connected to the corresponding pre-charging data lines respectively; where, at the pre-charging stage, the pre-charging multiplexing switches are turned off; and in an $n^{th}$ one of the second charging stages, controlling, by the gate driving circuit, the corresponding gate line to be turned on, and turning on an $n^{th}$ pre-charging multiplexing switch; where N is a positive integer and n is a positive integer smaller than or equal to N.

In a possible embodiment of the present disclosure, in a case that a transistor in the pixel circuit is a p-type transistor, the initial voltage is smaller than a minimum grey-scale voltage from the source driver; and in a case that a transistor in the pixel circuit is an n-type transistor, the initial voltage is greater than a maximum grey-scale voltage from the source driver.

In a possible embodiment of the present disclosure, the second charging time period includes N second charging stages arranged one after another, where N is a positive integer, and the multiplexing driving method further includes: at an $n^{th}$ one of the second charging stages, applying an on control signal to an $n^{th}$ pre-charging multiplexing control end to turn on an $n^{th}$ pre-charging multiplexing switch, and applying, by the source driver, an $n^{th}$ one of second grey-scale voltages to the $n^{th}$ pre-charging multiplexing switch to write the $n^{th}$ one of the second grey-scale voltages to a pixel circuit in the row corresponding to the gate line and electrically connected to an $n^{th}$ pre-charging data line via the $n^{th}$ pre-charging multiplexing switch. The $n^{th}$ pre-charging data line is electrically connected to the $n^{th}$ pre-charging multiplexing switch, where n is a positive integer smaller than or equal to N, and the $n^{th}$ pre-charging multiplexing switch is electrically connected to the $n^{th}$ pre-charging multiplexing control end.

In a possible embodiment of the present disclosure, N is the positive integer greater than 1, an $m^{th}$ one of second interval stages is arranged between an $m^{th}$ one of the second charging stages and a (m+1)th one of the second charging stages in the second charging time period, where m is a positive integer less than N; and a duration of the $m^{th}$ one of the second interval stages is greater than a first predetermined time period, to enable a voltage from the source driver to be switched from an $m^{th}$ one of second grey-scale voltages to an $(m+1)^{th}$ one of the second grey-scale voltages during the $m^{th}$ one of the second interval stages.

In a possible embodiment of the present disclosure, the second charging time period includes a second charging end stage arranged after an $N^{th}$ one of the second charging stages, and the multiplexing driving method further includes: at the second charging end stage, enabling an $N^{th}$ pre-charging multiplexing switch to be in a total OFF state.

In a possible embodiment of the present disclosure, the first charging time period includes A first charging stages, where A is a positive integer, and the multiplexing driving method further includes: at an $a^{th}$ one of the first charging stages, applying an on control signal to an $a^{th}$ non-pre-charging multiplexing control end, to turn on an $a^{th}$ non-pre-charging multiplexing switch, and applying, by the source driver, an $a^{th}$ one of first grey-scale voltages to the $a^{th}$ non-pre-charging multiplexing switch, to write the $a^{th}$ one of the first grey-scale voltages into an $a^{th}$ non-pre-charging data line via the $a^{th}$ non-pre-charging multiplexing switch. The $a^{th}$ non-pre-charging data line is electrically connected to the $a^{th}$ non-pre-charging multiplexing switch, where a is a positive integer smaller than or equal to A, and the $a^{th}$ non-pre-charging multiplexing switch is electrically connected to the $a^{th}$ non-pre-charging multiplexing control end.

In a possible embodiment of the present disclosure, duration of each first charging stage is greater than a second predetermined time period.

In a possible embodiment of the present disclosure, a charging-interval time period is arranged from a time point where an $A^{th}$ one of the first charging stages in the first charging time period ends to a time point where a first one of the second charging stages in the second charging time period begins, and the multiplexing driving method further includes: within the charging-interval time period, enabling an $A^{th}$ non-pre-charging multiplexing switch to be in a total OFF state, and turning on the corresponding gate line.

In a possible embodiment of the present disclosure, duration of each first charging stage is greater than duration of each second charging stage.

In another aspect, the present disclosure provides in some embodiments a multiplexing driving module for a display module. The display module includes a source driver, a gate driving circuit, a multiplexing circuit and a pixel circuit, pixel circuits in a same row are electrically connected to a same gate line, and pixel circuits in a same column are electrically connected to a same data line. The multiplexing circuit includes at least one multiplexing sub-circuit including a plurality of multiplexing switches, a control end of each multiplexing switch in a same multiplexing sub-circuit is electrically connected to a multiplexing control end, a first end of the multiplexing switch is electrically connected to the source driver, a second end of the multiplexing switch is electrically connected to a corresponding data line, and a driving period includes an initial time period, a first charging time period and a second charging time period arranged one after another. In the multiplexing sub-circuit, at least one multiplexing switch serves as a pre-charging multiplexing switch, and the multiplexing control end electrically connected to a control end of the pre-charging multiplexing switch is a pre-charging multiplexing control end. In the multiplexing sub-circuit, the multiplexing switches other than the at least one pre-charging multiplexing switch are non-pre-charging multiplexing switches, and the multiplexing control end electrically connected to a control end of each non-pre-charging multiplexing switch is a non-pre-charging multiplexing control end. The data line electrically connected to the pre-charging multiplexing switch is a pre-charging data line, and the data line electrically connected to each non-pre-charging multiplexing switch is a non-pre-charging data line. The source driver is configured to apply an initial voltage to the pre-charging multiplexing switch within the initial time period, apply a corresponding grey-scale voltage to the non-pre-charging multiplexing switches within the first charging time period, and apply a corresponding grey-scale voltage to pre-charging multiplexing switches within the second charging time period. The gate driving circuit is configured to control a corresponding gate line to be turned on within the second charging time period, so as to write the corresponding grey-scale voltage into the pixel circuits in a row corresponding to the gate line and electrically connected to corresponding non-pre-charging data lines respectively. Within the initial time period, each pre-charging multiplexing switch is turned on under the control of an on control signal from corresponding pre-charging multiplexing control end, so as to write the initial voltage into a corresponding pre-charging data line. within the second charging time period, pre-charging multiplexing switches are turned on under the control of on control signals from corresponding pre-charging multiplexing control ends in a time-division manner, so as to write the corresponding grey-scale voltage into the pixel circuits in a row corresponding to the gate line and electrically connected to the corresponding pre-charging data lines respectively in the time-division manner. Each corresponding pre-charging data line is electrically connected to the turned-on pre-charging multiplexing switch. Within the second charging time period, non-pre-charging multiplexing switchers are turned on under the control of on control signals from corresponding non-pre-charging multiplexing control ends in a time-division manner, so as to write the corresponding grey-scale voltage into the corresponding non-pre-charging data lines in a time-division manner via the turned-on non-pre-charging multiplexing switches.

In a possible embodiment of the present disclosure, the multiplexing driving module further includes a multiplexing driving control circuit, configured to, within the initial time period, apply the on control signal to the pre-charging multiplexing control end, so as to turn on the pre-charging multiplexing switch, and control the source driver to apply the initial voltage to the pre-charging multiplexing switch, so as to write the initial voltage into the corresponding pre-charging data line via the turned-on pre-charging multiplexing switch; within the first charging time period, apply the on control signals to different non-pre-charging multiplexing control ends in the time-division manner, so as to turn on the different non-pre-charging multiplexing switches in the time-division manner, and control the source driver to apply the corresponding grey-scale voltage to the non-pre-charging multiplexing switches, so as to write the corresponding grey-scale voltage into the corresponding non-pre-charging data lines in the time-division manner via the turned-on non-pre-charging multiplexing switches; and within the second charging time period, control the gate driving circuit to turn on the corresponding gate line, so as to write the corresponding grey-scale voltage into the pixel circuits in the row corresponding to the gate line and electrically connected to the corresponding non-pre-charging data lines respectively, apply the on control signals to different pre-charging multiplexing control ends in the time-division manner, so as to turn on the different pre-charging multiplexing switches in the time-division manner, and control the source driver to apply the corresponding grey-scale voltage to the pre-charging multiplexing switches, so as to write the corresponding grey-scale voltage to the pixel circuits in the row corresponding to the gate line and electrically connected to the corresponding pre-charging data lines respectively in the time-division manner via the turned-on pre-charging multiplexing switches.

In a possible embodiment of the present disclosure, the pixel circuits corresponding to a same color are each electrically connected to the pre-charging multiplexing switch or a non-pre-charging multiplexing switch.

In a possible embodiment of the present disclosure, in a case that a transistor in the pixel circuit is a p-type transistor, the initial voltage is smaller than a minimum grey-scale voltage from the source driver; and in a case that a transistor in the pixel circuit is an n-type transistor, the initial voltage is greater than a maximum grey-scale voltage from the source driver.

In yet another aspect, the present disclosure provides in some embodiments a display device including the above-mentioned multiplex driving module.

In a possible embodiment of the present disclosure, the display device further includes the display module. The display module includes the source driver, the gate driving circuit, the multiplexing circuit and the pixel circuits. The pixel circuits in the same row are electrically connected to the same gate line, and the pixel circuits in the same column are electrically connected to the same data line. The gate driving circuit is electrically connected to the gate line, and configured to be controlled by the multiplexing driving control circuit in the multiplexing driving module, so as to apply a corresponding gate driving signal to the gate line. The multiplexing circuit includes at least one multiplexing sub-circuit including the plurality of multiplexing switches, the control end of the multiplexing switch in the same multiplexing sub-circuit is electrically connected to the multiplexing control end, the first end of the multiplexing switch is electrically connected to the source driver, and the second end of the multiplexing switch is electrically connected to the corresponding data line. The source driver is configured to be controlled by the multiplexing driving control circuit, so as to output the corresponding grey-scale voltage.

DETAILED DESCRIPTION

Figure 1:
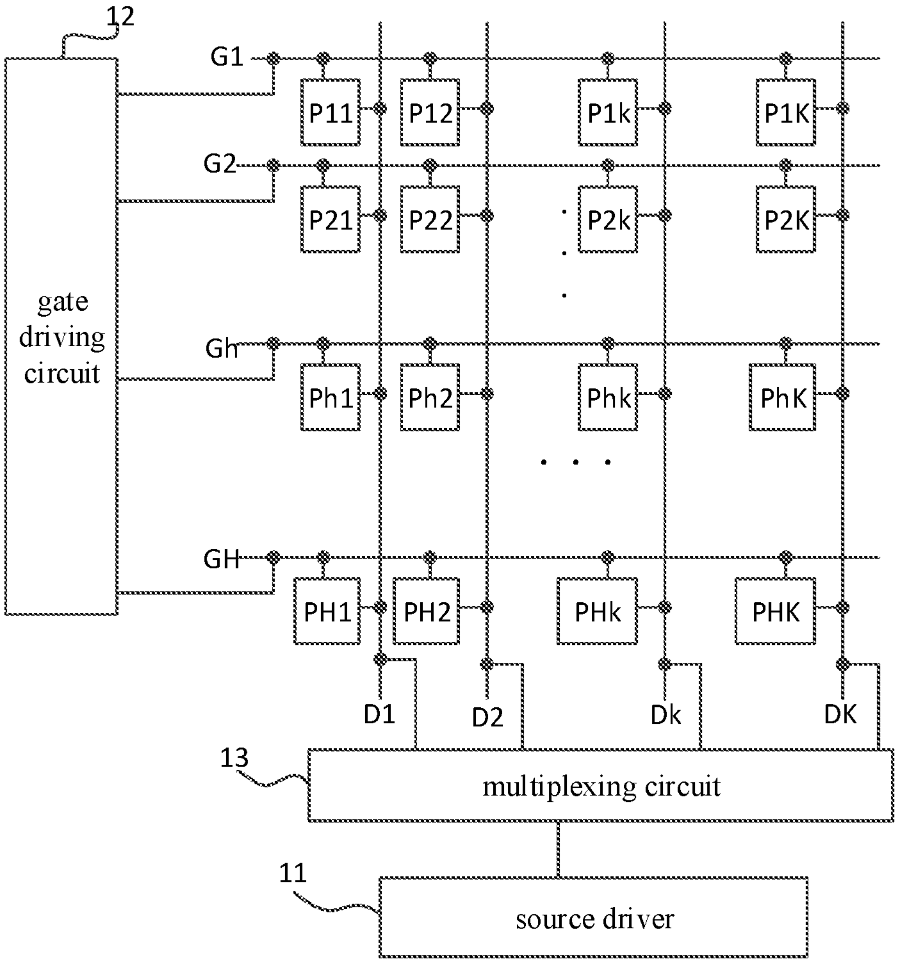
FIG. 1 is a schematic view showing a display module to which a multiplexing driving method is applied according to at least one embodiment of the present disclosure.

The technical solutions in the embodiments of the present disclosure will be described hereinafter clearly with reference to the drawings of the embodiments of the present disclosure. Apparently, the following embodiments merely relate to a part of, rather than all of, the embodiments of the present disclosure, and based on these embodiments, a person of ordinary skill in the art may, without any creative effort, obtain other embodiments, which also fall within the scope of the present disclosure.

The present disclosure provides in some embodiments a multiplexing driving method for a display module. The display module includes a source driver, a gate driving circuit, a multiplexing circuit and a pixel circuit, pixel circuits in a same row are electrically connected to a same gate line, and pixel circuits in a same column are electrically connected to a same data line. The multiplexing circuit includes at least one multiplexing sub-circuit including a plurality of multiplexing switches, a control end of each multiplexing switch in a same multiplexing sub-circuit is electrically connected to a multiplexing control end, a first end of the multiplexing switch is electrically connected to the source driver, a second end of the multiplexing switch is electrically connected to a corresponding data line, and a driving period includes an initial time period, a first charging time period and a second charging time period arranged one after another. In the multiplexing sub-circuit, at least one multiplexing switch serves as a pre-charging multiplexing switch, and the multiplexing control end electrically connected to a control end of the pre-charging multiplexing switch is a pre-charging multiplexing control end. In the multiplexing sub-circuit, the multiplexing switches other than the at least one pre-charging multiplexing switch are non-pre-charging multiplexing switches, and the multiplexing control end electrically connected to a control end of each non-pre-charging multiplexing switch is a non-pre-charging multiplexing control end. The data line electrically connected to the pre-charging multiplexing switch is a pre-charging data line, and the data line electrically connected to each non-pre-charging multiplexing switch is a non-pre-charging data line. The multiplexing driving method includes: within the initial time period, applying an on control signal to the pre-charging multiplexing control end to turn on the pre-charging multiplexing switch, and applying, by the source driver, an initial voltage to the pre-charging multiplexing switch to write the initial voltage into the corresponding pre-charging data line via the turned-on pre-charging multiplexing switch; within the first charging time period, applying an on control signal to different non-pre-charging multiplexing control ends in a time-division manner to turn on the different non-pre-charging multiplexing switches in the time-division manner; and applying, by the source driver, a corresponding grey-scale voltage to the non-pre-charging multiplexing switches to write the corresponding grey-scale voltage into corresponding non-pre-charging data lines in a time-division manner via the turned-on non-pre-charging multiplexing switches; and within the second charging time period, controlling, by the gate driving circuit, a corresponding gate line to be turned on, to write the corresponding grey-scale voltage into the pixel circuits in a row corresponding to the gate line and electrically connected to the corresponding non-pre-charging data lines respectively; applying an on control signal to different pre-charging multiplexing control ends in a time-division manner to turn on the different pre-charging multiplexing switches in the time-division manner; applying, by the source driver, a corresponding grey-scale voltage to the pre-charging multiplexing switches to write the corresponding grey-scale voltage to the pixel circuits in a row corresponding to the gate line and electrically connected to the corresponding pre-charging data lines respectively in a time-division manner via the turned-on pre-charging multiplexing switches. Each corresponding pre-charging data line is electrically connected to the turned-on pre-charging multiplexing switch.

In the multiplexing sub-circuit, at least one multiplexing switch serves as the pre-charging multiplexing switch, the multiplexing switches other than the at least one pre-charging multiplexing switch are the non-pre-charging multiplexing switches. The driving period may include the initial time period during which each pre-charging multiplexing switch is turned on, and the source driver applies the initial voltage to the pre-charging data line, so as to charge a parasitic capacitance of the pre-charging data line, and write the same initial voltage into each pre-charging data line, thereby to clear a residual grey-scale voltage within a previous row. In addition, in at least one embodiment of the present disclosure, during the initial time period, only the pre-charging multiplexing switch is turned on, the non-pre-charging multiplexing switches are not turned on, a load is low during writing the initial voltage, and thereby a driving time period may be shortened.

In the relevant art, one charging manner is as follows. Within an initial time period, all multiplexing switches in a multiplexing sub-circuit are controlled to be turned on, an initial voltage is written into all data lines electrically connected to the multiplexing sub-circuit. Within a second charging time period, a corresponding gate line is turned on, a pixel storage capacitor in a pixel circuit in a corresponding row and corresponding column is charged via the initial voltage, and then a grey-scale voltage from a source driver is applied to the pixel storage capacitor in the pixel circuit in the corresponding row and corresponding column via the multiplexing switch. A charging process and a discharging process are performed in a repeated manner via the initial voltage and the grey-scale voltage, resulting in a relatively high power consumption. Based on the above, in at least one embodiment of the present disclosure, it is able to reduce the quantity of pixel circuits for pre-charging (which the initial voltage is written into during the initial time period), thereby to reduce the power consumption.

In the multiplexing driving method according to at least one embodiment of the present disclosure, within the first charging time period, different non-pre-charging multiplexing switches are turned on in the time-division manner, so as to enable the source driver to write the corresponding grey-scale voltages to different non-pre-charging data lines in the time-division manner, and charge parasitic capacitances of the non-pre-charging data lines. At this time, the gate line is turned off. After the non-pre-charging multiplexing switches have been turned off, the grey-scale voltage is maintained by the parasitic capacitances of the non-pre-charging data lines. During the second charging time period, the gate driving circuit controls the corresponding gate line to be turned on, each parasitic capacitance of each non-pre-charging data line is connected in parallel with a pixel storage capacitance in a pixel circuit in a corresponding row and electrically connected to the corresponding non-pre-charging data line, and thereby charges the pixel storage capacitance in the pixel circuit in the corresponding row and electrically connected to the corresponding non-pre-charging data line, so as to write the grey-scale voltage into the pixel circuit which is electrically connected to the corresponding non-pre-charging data line. During the second charging time period, the gate driving circuit controls the corresponding gate line to be turned on, and different the pre-charging multiplexing switches are turned on in the time-division manner, and the source driver applies the corresponding grey-scale voltage to the pixel circuits in a corresponding row and electrically connected to the corresponding pre-charging data lines, and charges pixel storage capacitors in the pixel circuits in the corresponding row and electrically connected to the corresponding pre-charging data lines. Hence, in the multiplexing driving method according to at least one embodiment of the present disclosure, it is able to improve the utilization rate of the source driver. Within the first charging time period, the source driver writes the corresponding grey-scale voltage to different non-pre-charging data lines in the time division manner, and charges the parasitic capacitances of the non-pre-charging data lines, so that when the gate line is turned off, it is able for the source driver to apply the corresponding grey-scale voltage to pixel circuits in the corresponding row and electrically connected to the corresponding pre-charging data lines. As a result, in at least one embodiment of the present disclosure, it is able to increase a gap between ON time periods of each pre-charging multiplexing switch, and mitigate chromatic aberration. In addition, in at least one embodiment of the present disclosure, it is able to increase the charging rate by combining a passive charging mode with an active charging mode.

In the related art, when the source driver outputs a voltage, in a case that a gate line is turned on, an extreme value of the voltage from the source driver may be recorded in the pixel storage capacitor. In a case that the voltage from the source driver is not stable yet when turning on the multiplexing switch, it is impossible to write a subsequent stable grey-scale voltage into the pixel storage capacitor, and thus the chromatic aberration occurs. In at least one embodiment of the present disclosure, it is able to increase the gap between the ON time periods of each pre-charging multiplexing switch, so that the voltage from the source driver is stable when turning on the pre-charging multiplexing switch. In this regard, when the source driver outputs the grey-scale voltage, it is able to mitigate the chromatic aberration.

In the related art, in the case that the source driver is multiplexed to a large extent (namely, grey-scale voltage is applied to a plurality of data lines via one multiplexing sub-circuit in a time-division manner), due to a large TFT (thin film transistor) resistance, the passive charging mode has a slow charging speed and low charging rate. The passive charging mode is described as follows. The grey-scale voltage is written into data lines in a time division manner when the gate line is turned off. Next, the gate line is turned on, and the grey-scale voltage is written into the pixel circuits. When the gate line is turned on, it is actually that the parasitic capacitance of each data line charges the pixel storage capacitance in each pixel circuit, which is referred to as the passive charging mode. Based on this, in at least one embodiment of the present disclosure, the passive charging mode is combined with the active charging mode, so as to increase the charging rate. In at least one embodiment of the present disclosure, the active charging mode refers to that when the gate line is turned on, the multiplexing switch is turned on at the same time, so as to charge the pixel storage capacitance in the pixel circuit through the grey-scale voltage.

Figure 3:
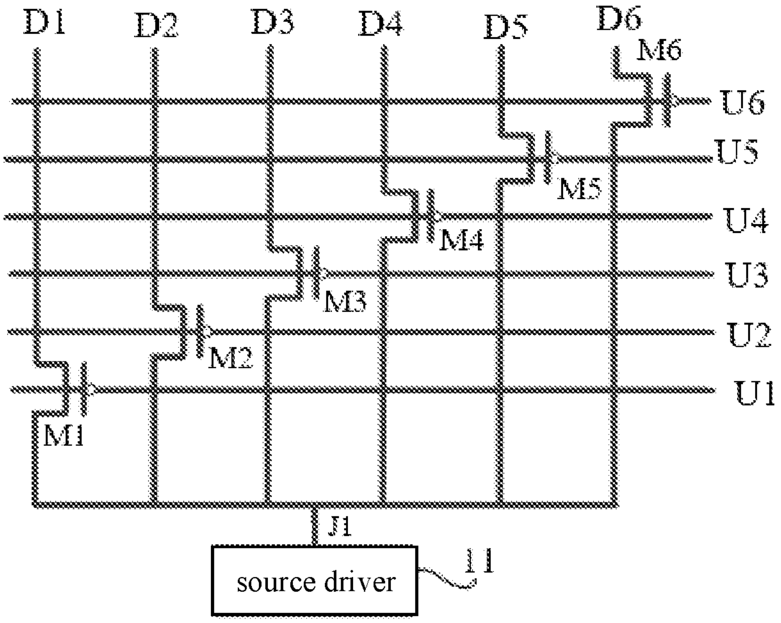
FIG. 3 is a circuit diagram of a multiplexing sub-circuit in a multiplexing circuit according to at least one embodiment of the present disclosure.

As shown in FIG. 1, the display module to which the multiplexing driving method is applied includes a source driver 11, a gate driving circuit 12, a multiplexing circuit 13 and pixel circuits in rows and columns. The pixel circuits in the same row are electrically connected to the same gate line, and the pixel circuits in the same column are electrically connected to the same data line. The multiplexing circuit 13 includes at least one multiplexing sub-circuit (a specific structure of the multiplexing sub-circuit is shown in FIG. 3), the multiplexing sub-circuit includes the plurality of multiplexing switches, the control end of each multiplexing switch in the same multiplexing sub-circuit is electrically connected to the multiplexing control end, the first end of the multiplexing switch is electrically connected to the source driver, and the second end of the multiplexing switch is electrically connected to the corresponding data line (the multiplexing switches in the multiplexing sub-circuit and the connection relationship among ends of the multiplexing switches are shown in FIG. 3).

During the implementation, each first end of each multiplexing switch in the same multiplexing sub-circuit may be, but not limited to, electrically connected to a same voltage output terminal in the source driver.

During the implementation, the display module may include, but not limited to, a plurality of source drivers.

In FIG. 1, G1 denotes a first gate line, G2 denotes a second gate line, Gh denotes an $h^{th}$ gate line, GH denotes an $H^{th}$ gate line, H is an integer greater than 3, and h is an integer greater than 2 and smaller than H.

D1 denotes a first data line, D2 denotes a second data line, Dk denotes a $k^{th}$ data line, DK denotes a $K^{th}$ data line, K is an integer greater than 3, and k is an integer greater than 2 and smaller than H.

In FIG. 1, P11 denotes a pixel circuit in a first row and a first column, P12 denotes a pixel circuit in the first row and a second column, P1*k* denotes a pixel circuit in the first row and a $k^{th}$ column, and P1K denotes a pixel circuit in the first row and a $K^{th}$ column.

P21 denotes a pixel circuit in a second row and the first column, P22 denotes a pixel circuit in the second row and the second column, P2*k* denotes a pixel circuit in the second row and the $k^{th}$ column, and P2K denotes a pixel circuit in the second row and the $K^{th}$ column pixel circuit.

Ph1 denotes a pixel circuit in an $h^{th}$ row and the first column, Ph2 denotes a pixel circuit in the $h^{th}$ row and the second column, Phk denotes a pixel circuit in the $h^{th}$ row and the $k^{th}$ column, and PhK denotes a pixel circuit in the $h^{th}$ row and the $K^{th}$ column.

PH1 denotes a pixel circuit in an $H^{th}$ row and the first column, PH2 denotes a pixel circuit in the $H^{th}$ row and the second column, PHk denotes a pixel circuit in the $H^{th}$ row and the $k^{th}$ column, and PHK denotes a pixel circuit in the $H^{t}$ row and the $K^{th}$ column.

P11, P12, P1*k* and P1K are electrically connected to the first gate line G1, P21, P22, P2*k* and P2K are electrically connected to the second gate line G2, ph1, ph2, phk and PhK are electrically connected to the $h^{th}$ gate line Gh, PH1, PH2, PHk and PHK are electrically connected to the $H^{th}$ gate line GH.

P11, P21, Ph1 and PH1 are electrically connected to the first data line D1, P12, P22, Ph2 and PH2 are electrically connected to the second data line D2, P1*k*, P2*k*, Phk and PHk are electrically connected to the kth data line Dk, and P1K, P2K, PhK and PHK are all electrically connected to the Kth data line DK.

The multiplexing circuit 13 is electrically connected to each voltage output terminal of the source driver 11 and each data line, and each multiplexing sub-circuit in the multiplexing circuit 13 is configured to apply the voltage from the voltage output terminal of the source driver 11 to multiple data lines in a time-division manner.

Figure 2A:
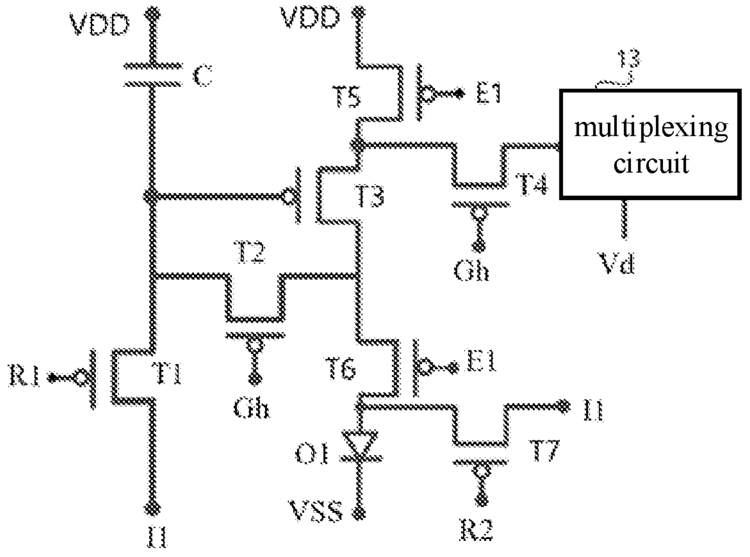
FIG. 2A is a circuit diagram of a pixel circuit according to at least one embodiment of the present disclosure.

FIG. 2A is a circuit diagram of the pixel circuit. In actual use, a structure of the pixel circuit is not limited to a structure of the pixel circuit shown in FIG. 2A.

In FIG. 2A, VDD denotes a high voltage terminal and VSS denotes a low voltage terminal.

As shown in FIG. 2A, the pixel circuit may include a driving transistor T3, a data written-in transistor T4, a first light-emission control transistor T5, a second light-emission control transistor T6, a pixel storage capacitor C, a first resetting transistor T1, a compensation control transistor T2, a second resetting transistor T7 and an organic light-emitting diode O1.

A gate electrode of T4 is electrically connected to the $h^{th}$ gate line Gh, a source electrode of T4 is electrically connected to the multiplexing circuit 13, so as to receive the grey-scale voltage Vd, and a drain electrode of T4 is electrically connected to a source electrode of T3.

A gate electrode of T3 is electrically connected to a first end of C, and a second end of C is electrically connected to the high voltage terminal VDD.

A gate electrode of T1 is electrically connected to a first resetting end R1, a source electrode of T1 is electrically connected to a resetting voltage end I1, and a drain electrode of T1 is electrically connected to the gate electrode of T3.

A gate electrode of T5 is electrically connected to a light-emission control end E1, a source electrode of T5 is electrically connected to the high voltage terminal VDD, and a drain electrode of T5 is electrically connected to the source electrode of T3.

A gate electrode of T6 is electrically connected to the light-emission control end E1, a source electrode of T6 is electrically connected to a drain electrode of T3, a drain electrode of T6 is electrically connected to an anode of O1, and a cathode of O1 is electrically connected to the low voltage terminal VSS.

A gate electrode of the T7 is electrically connected to the second resetting end R2, a source electrode of the T7 is electrically connected to the resetting voltage end I1, and a drain electrode of the T7 is electrically connected to the drain electrode of the T6.

A gate electrode of T2 is electrically connected to the $h^{th}$ gate line Gh, a source electrode of T2 is electrically connected to the gate electrode of T3, and a drain electrode of T2 is electrically connected to the drain electrode of T3.

In the pixel circuit shown in FIG. 2A, each transistor is, but not limited to, a p-type field effect transistor.

In the pixel circuit shown in FIG. 2A, T1, T2, T4, T5, T6 and T7 each serves a switch and T3 is a driving transistor.

Figure 2B:
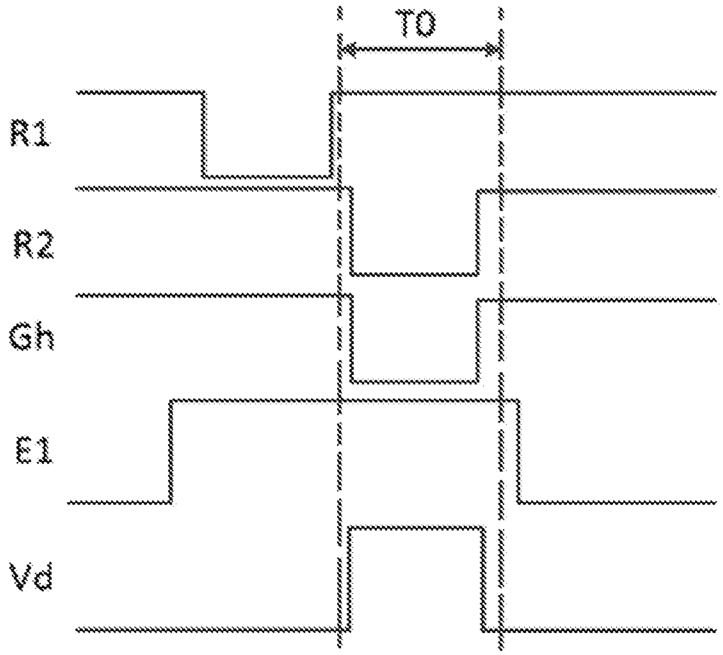
FIG. 2B is a sequence diagram of the pixel circuit according to at least one embodiment of the present disclosure.

FIG. 2B is a sequence diagram of the pixel circuit shown in FIG. 2A.

As shown in FIG. 2B, during the operation of the pixel circuit in FIG. 2A, within a data written-in time period TO, Gh applies a low voltage signal, T4 and T2 are turned on, and the multiplexing circuit 13 applies a grey-scale voltage to the source electrode of T3. At this time, the gate electrode of T3 is electrically connected to the drain electrode of T3, so T3 serves as a diode. The pixel storage capacitor C stores the grey-scale voltage, in the case that Gh applies the low voltage signal, a voltage at the source electrode of T3 is the grey-scale voltage from the multiplexing circuit 13, and a voltage at the gate electrode of T3 is a sum of the grey-scale voltage and a threshold voltage of T3.

Figure 2C:
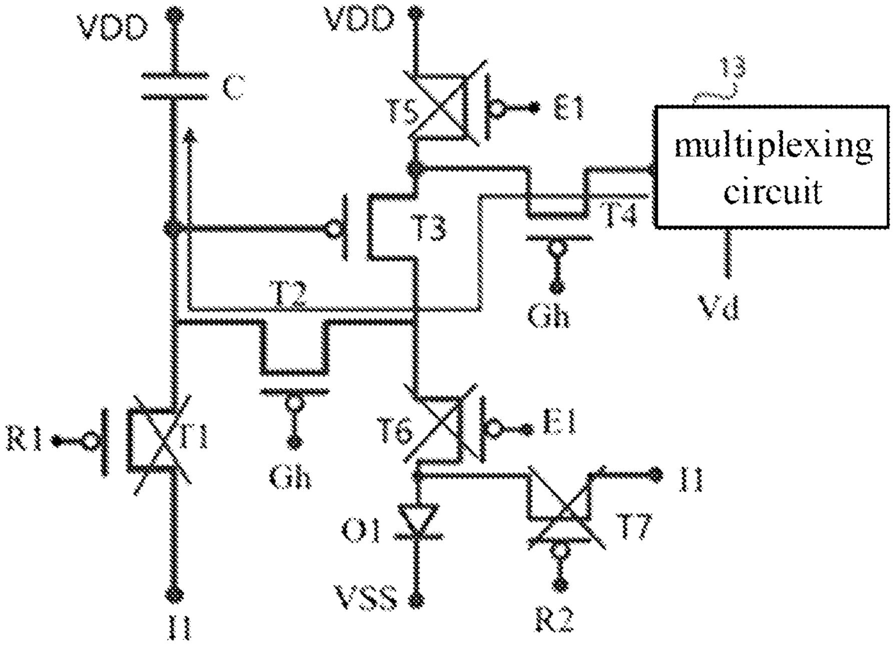
FIG. 2C is an equivalent circuit diagram of the pixel circuit within a data written-in time period T0.

FIG. 2C is an equivalent circuit diagram of the pixel circuit in FIG. 2*a* within the data written-in time period TO. Within the data written-in time period TO, T5, T1, T6 and T7 are turned off, the pixel storage capacitor C is charged via the grey-scale voltage from the multiplexing circuit 13.

In at least one embodiment of the present disclosure, "turning on the respective gate line" refers to that the gate driving circuit applies a gate ON control signal to the corresponding gate line, so as to turn on a data written-in transistor of which a gate electrode is electrically connected to the corresponding gate line in the pixel circuit.

"Turning off the corresponding gate line" refers to that the gate driving circuit applies a gate OFF control signal to the corresponding gate line, so as to turn off the data written-in transistor of which the gate electrode is electrically connected to the corresponding gate line in the pixel circuit.

During the implementation, the pixel circuits corresponding to a same color are each electrically connected to the pre-charging multiplexing switch or a non-pre-charging multiplexing switch.

In at least one embodiment of the present disclosure, due to a large difference between the charging rates of the active charging mode and the charging rate of the passive charging mode, the active charging mode or the passive charging mode is used in each of the pixel circuits corresponding to the same color, so as to reduce a difference between charging rates of the pixel circuits corresponding to the same color, thereby to avoid Mura (uneven display) in a vertical direction (a direction where the data line extends).

In at least one embodiment of the present disclosure, the initial voltage is within a predetermined voltage range.

In a possible embodiment of the present disclosure, in a case that each transistor in the pixel circuit is a p-type transistor, the initial voltage is smaller than a minimum grey-scale voltage from the source driver, in a case that each transistor in the pixel circuit is an n-type transistor, the initial voltage is greater than a maximum grey-scale voltage from the source driver, so as to charge each pre-charging data line to be below or above the corresponding grey-scale voltage in an short initial time period as possible, thereby to allocate more time period to the written-in of the grey-scale voltage. During the implementation, the second charging time period may include a pre-charging stage and N second charging stages arranged one after another, and the multiplexing driving method may further include: at the pre-charging stage, controlling, by the gate driving circuit, the corresponding gate line to be turned on, to write the initial voltage to the pixel circuits in the row corresponding to the gate line and electrically connected to the corresponding pre-charging data lines respectively, where at the pre-charging stage, the pre-charging multiplexing switches are turned off, and, at an $n^{th}$ one of the second charging stages, controlling, by the gate driving circuit, the corresponding gate line to be turned on, and turning on an $n^{th}$ pre-charging multiplexing switch, where N is a positive integer and n is a positive integer smaller than or equal to N.

In a possible embodiment of the present disclosure, the second charging time period may include the pre-charging stage arranged at the beginning thereof. At the pre-charging stage, a corresponding gate line is turned on, each pre-charging multiplexing switch is in an off state, and at this time, the parasitic capacitance on the pre-charging data line is connected in parallel with the pixel storage capacitance in a pixel circuit in a corresponding row and electrically connected to the pre-charging data line, and thereby charges the pixel storage capacitance, so as to write the initial voltage stored by the parasitic capacitance on the pre-charging data line into the pixel storage capacitance.

During the implementation, the second charging time period includes N second charging stages arranged one after another, where N is a positive integer. The multiplexing driving method includes: at an $n^{th}$ one of the second charging stages, applying an on control signal to an $n^{th}$ pre-charging multiplexing control end to turn on an $n^{th}$ pre-charging multiplexing switch, and applying, by the source driver, an $n^{t}$ one of second grey-scale voltages to the $n^{th}$ pre-charging multiplexing switch, to write the $n^{th}$ one of the second grey-scale voltages to a pixel circuit in the row corresponding to the gate line and electrically connected to an $n^{th}$ pre-charging data line via the $n^{th}$ pre-charging multiplexing switch. The $n^{th}$ pre-charging data line is electrically connected to the $n^{th}$ pre-charging multiplexing switch, where n is a positive integer smaller than or equal to N, and the $n^{th}$ pre-charging multiplexing switch is electrically connected to the $n^{th}$ pre-charging multiplexing control end.

In at least one embodiment of the present disclosure, when the multiplexing sub-circuit includes N pre-charging multiplexing switches, the second charging time period may include N second charging stages. At the $n^{th}$ one of the second charging stages, an on control signal is applied to the $n^{th}$ pre-charging multiplexing control end, so as to turn on the $n^{th}$ pre-charging multiplexing switch. The source driver applies an $n^{th}$ one of second grey-scale voltages to the pixel circuit in a corresponding row and electrically connected to the $n^{th}$ pre-charging data line, and charges the pixel storage capacitor in the pixel circuit via the $n^{th}$ one of the second grey-scale voltages.

At the nth one of the second charging stages, a voltage on the $n^{th}$ pre-charging data line is stable as the $n^{th}$ one of the second grey-scale voltages. That is, at the $n^{th}$ one of the second charging stages, a rise or drop in the voltage does not occur, so it is able to prevent the extreme value from being written into the pixel circuit.

In a possible embodiment of the present disclosure, N may be the positive integer greater than 1. An $m^{th}$ one of second interval stages is arranged between an $m^{th}$ one of the second charging stages and a $(m+1)^{th}$ one of the second charging stages in the second charging time period, where m is the positive integer less than N, and duration of the $m^{th}$ one of the second interval stages is greater than a first predetermined time period, to enable a voltage from the source driver to be switched from an $m^{th}$ one of second grey-scale voltages to an $(m+1)^{th}$ one of the second grey-scale voltages during the $m^{th}$ one of the second interval.

In at least one embodiment of the present disclosure, the first predetermined time may be determined according to practical applications. When the first predetermined time is determined, it requires that the voltage from the source driver is stabilized as the $(m+1)^{th}$ one of the second grey-scale voltages during the $m^{th}$ one of the second interval stages, so that a rising edge and/or falling edge of the voltage from the source driver does not occur during the $(m+1)^{th}$ one of the second charging stages.

In at least one embodiment of the present disclosure, when the duration of the $m^{th}$ one of the second interval stages is greater than the first predetermined time, within the $(m+1)^{th}$ one of the second charging stages, it is able to charge the pixel circuit sufficiently, and prevent the occurrence of that the charging of the pixel circuit is stopped when the pixel circuit is charged to an intermediate voltage between the $m^{th}$ one of the second grey-scale voltages and the $(m+1)^{th}$ one of the second grey-scale voltages, thereby to avoid an insufficient charging rate.

In actual use, when the second charging time period includes at least two second charging stages, a second interval stage is arranged between two adjacent second charging stages, duration of the second interval stage is greater than the first predetermined time period, so that the grey-scale voltage is stable during the second charging stage following the second interval stage. During the second interval stage, a rise or drop in the voltage on the pre-charging data line occurs.

During the implementations, the second charging time period may include a second charging end stage arranged after an $N^{th}$ one of the second charging stages, and the multiplexing driving method further includes: at the second charge end stage, enabling the $N^{th}$ pre-charging multiplexing switch to be in a total OFF state.

In at least one embodiment of the present disclosure, during the second charging time period, after all of the pre-charging multiplexing switches have been turned on, the second charging end stage is arranged. At the second charging end stage, a last turned-on $N^{th}$ pre-charging multiplexing switch is in a total OFF state. After that, it is able to turn off the corresponding gate line.

In at least one embodiment of the present disclosure, the first charging time period may include A first charging stages, where A is a positive integer, and the multiplexing driving method further includes: in an $a^{th}$ one of the first charging stages, applying an on control signal to an $a^{th}$ non-pre-charging multiplexing control end, to turn on an $a^{th}$ non-pre-charging multiplexing switch, and applying, by the source driver, an $a^{th}$ one of first grey-scale voltages to the $a^{th}$ non-pre-charging multiplexing switch, to write the $a^{th}$ one of the first grey-scale voltages into an $a^{th}$ non-pre-charging data line via the $a^{th}$ non-pre-charging multiplexing switch. The $a^{th}$ non-pre-charging data line is electrically connected to the $a^{th}$ non-pre-charging multiplexing switch, where a is a positive integer smaller than or equal to A, and the $a^{th}$ non-pre-charging multiplexing switch is electrically connected to the $a^{th}$ non-pre-charging multiplexing control end.

During the implementation, when the multiplexing sub-circuit includes A non-pre-charging multiplexing switches, the first charging time period may include A first charging stages. In the $a^{th}$ one of the first charging stages, the $a^{th}$ non-pre-charging multiplexing switch is turned on. The source driver apples the $a^{th}$ one of first grey-scale voltages to the $a^{th}$ non-pre-charging data line, so as to charge a parasitic capacitance of the $a^{th}$ non-pre-charging data line via the $a^{th}$ one of the first grey-scale voltages, and store the $a^{th}$ one of the first grey-scale voltages in the parasitic capacitance of the $a^{th}$ non-pre-charging data line. During the second charging time period, a corresponding gate line is turned on, a parasitic capacitance of each non-pre-charging data line is connected in parallel with a pixel storage capacitance of a pixel circuit in a corresponding row and electrically connected to each non-pre-charging data line, and thereby charges the pixel storage capacitance in the pixel circuit in the corresponding row and electrically connected to each non-pre-charging data line, so as to write each first grey-scale voltage into the corresponding pixel circuit.

In a possible embodiment of the present disclosure, duration of each first charging stage is greater than a second predetermined time period.

In at least one embodiment of the present disclosure, an $a^{th}$ one of first interval stages may be arranged between the $a^{th}$ one of the first charging stages and a $(a+1)^{th}$ one of the first charging stages. At the $a^{th}$ one of the first charging stages, since the corresponding gate line is not turned on, an intermediate voltage between the $a^{th}$ one of the first grey-scale voltages and a $(a+1)^{th}$ one of the first grey-scale voltages is not recorded in the pixel circuit in the corresponding row, so it is able for the duration of the first interval stage between two adjacent first charging stages to be very short. In addition, it requires that the duration of each first charging stage is greater than the second predetermined time period, so as to charge the parasitic capacitance of the corresponding data line sufficiently, thereby to achieve a sufficient charge rate.

In actual use, the second predetermined time period may be determined according to practical applications, so as to charge the parasitic capacitance of the corresponding data line sufficiently, thereby to achieve a sufficient charge rate.

In actual use, there may also be no first interval stage between the $a^{th}$ one of the first charging stages and the $(a+1)^{th}$ one of the first charging stages, and even the $a^{th}$ one of the first charging stage may partially overlap the $(a+1)^{th}$ one of the first charging stage.

During the implementation, a charging-interval time period is arranged from a time point where an $A^{th}$ one of the first charging stages in the first charging time period ends to a time point where a first one of the second charging stages in the second charging time period begins, and the multiplexing driving method further includes: within the charging-interval time period, enabling an $A^{th}$ non-pre-charging multiplexing switch to be in a total OFF state, and turning on the corresponding gate line.

In at least one embodiment of the present disclosure, a charging-interval time period is arranged from a time point where an $A^{th}$ one of the first charging stages in the first charging time period ends to a time point where a first one of the second charging stages in the second charging time period begins. During the charge-interval time period, it is necessary to ensure that the last turned-on non-pre-charging multiplexing switch is in a total OFF state, and the corresponding gate line is in a total ON state. In this regard, the second charge stage begins, and the pre-charging multiplexing switch is turned on.

In a possible embodiment of the present disclosure, duration of each first charging stage is greater than duration of each second charging stage.

In a possible embodiment of the present disclosure, the duration of each first charging stage may be greater than the duration of each second charging stage. At the first charging time period, since the corresponding gate line is turned off, even if a rising edge and/or a falling edge of the voltage on the non-pre-charging data line occurs in the first charging stage, it does not have a great impact on a voltage that is finally charged into the pixel circuit. However, in the second charging stage of the second charging time period, since the corresponding gate line is turned on while the grey-scale voltage is written, a rising edge and a falling edge of the voltage on the pre-charging data line cannot occur in the second charging stage, and therefore the duration of each first charging stage is set to be greater than the duration of each second charging stage.

During the implementation, each multiplexing switch may include a multiplexing switch transistor, a control electrode of which is electrically connected to the corresponding multiplexing control end, a first electrode of which is connected to the corresponding data line, and a second electrode of which is electrically connected to the source driver.

In a possible embodiment of the present disclosure, the multiplexing switch transistor may be a thin film transistor or a field effect transistor, the control electrode may be, but not limited to, a gate electrode, the first electrode may be, but not limited to, a source electrode or a drain electrode, and the second electrode may be, but not limited to, a drain electrode or a source electrode.

In at least one embodiment of the present disclosure, when the multiplexing switch transistor is a p-type transistor, the on control signal may be, but not limited to, a low voltage signal; and when the multiplexing switch transistor is an n-type transistor, the on control signal may be, but not limited to, a high voltage signal.

As shown in FIG. 3, the multiplexing sub-circuit includes a first multiplexing switch transistor M1, a second multiplexing switch transistor M2, a third multiplexing switch transistor M3, a fourth multiplexing switch transistor M4, a fifth multiplexing switch transistor M5 and a sixth multiplexing switch transistor M6.

A gate electrode of Mp is electrically connected to a $p^{th}$ multiplexing control end Up, a source electrode of Mp is electrically connected to the voltage output terminal J1 of the source driver 11, and a drain electrode of Mp is electrically connected to a $p^{th}$ data line Dp, where p is 1, 2, 3, 4, 5 or 6.

In FIG. 3, U1 denotes a first multiplexing control end, U2 denotes a second multiplexing control end, U3 denotes a third multiplexing control end, U4 denotes a fourth multiplexing control end, U5 denotes a fifth multiplexing control end, and U6 denotes a sixth multiplexing control end.

D1 denotes a first data line, D2 denotes a second data line, D3 denotes a third data line, D4 denotes a fourth data line, D5 denotes a fifth data line, and D6 denotes a sixth data line.

In the multiplexing sub-circuit in FIG. 3, each transistor is, but not limited to, a p-type thin film transistor.

In the multiplexing sub-circuit in FIGS. 3, M2 and M5 are pre-charging multiplexing switches, M1, M3, M4 and M6 are non-pre-charging multiplexing switches, D2 and D5 are pre-charging data lines, and D1, D3, D4 and D6 are non-pre-charging data lines. In addition, D2 and D5 may be data lines electrically connected to green pixel circuits, D1 and D4 may be data lines electrically connected to red pixel circuits, and D3 and D6 may be data lines electrically connected to blue pixel circuits. In FIG. 3, green is, but not limited to, a pre-charging color, and red and blue are, but not limited to, non-pre-charging colors.

Figure 4:
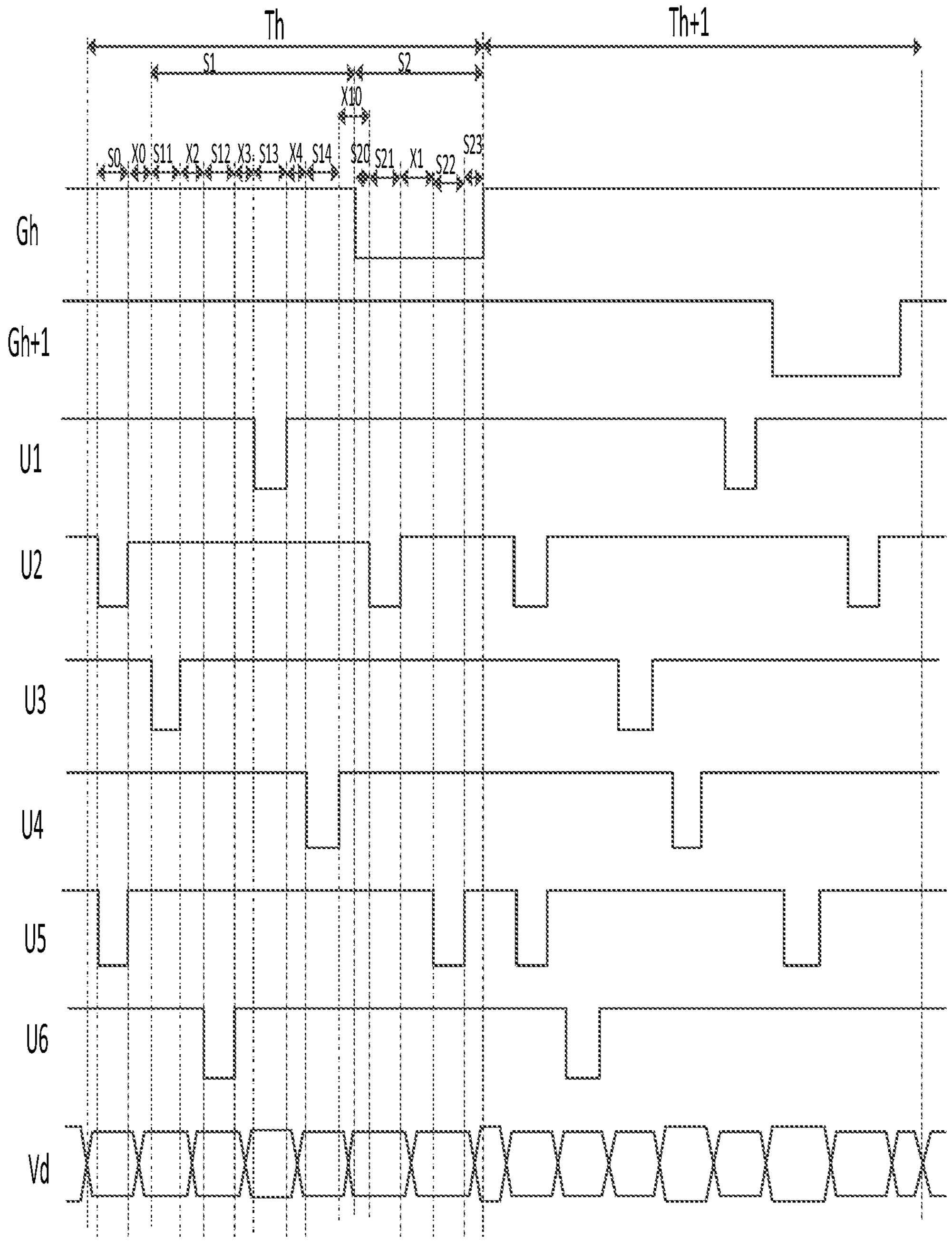
FIG. 4 is a sequence diagram of the multiplexing sub-circuit in FIG. 3.

As shown in FIG. 4, during the operation of the multiplexing sub-circuit in FIG. 3, a $h^{th}$ driving period Th includes an initial time period S0, a first charging time period S1 and a second charging time period S2 arranged one after another.

The first charging time period S1 includes a first one of first charging stages S11, a second one of the first charging stages S12, a third one of the first charging stages S13 and a fourth one of the first charging stages S14 arranged one after another.

The second charging time period S2 includes a pre-charging stage S20, a first one of second charging stages S21 and a second one of the second charging stages S22 arranged one after another.

A first one of second interval stages X1 is arranged between the first one of the second charging stages S21 and the second one of the second charging stages S22.

The second charging time period S2 may include a second charging end stage S23 arranged after the second one of the second charging stages S22.

At the second charging end stage S23, M5 is in a total OFF state.

A charging-interval time period X10 is arranged from a time point where the fourth one of the first charging stages S14 of the first charging time period S1 ends to a time point where the first one of the second charging stages S21 in the second charging time period S2 begins.

Within the charging-interval time period X10, M4 is in a total OFF state, and the $h^{th}$ gate line Gh in an ON state.

X10 partially overlaps S20.

A first one of first interval stages X2 is arranged between S11 and S12, a second one of the first interval stages X3 is arranged between S12 and S13, and a third one of the first interval stages X4 is arranged between S13 and S14.

At the pre-charging stage S20, the $h^{th}$ gate line Gh is turned on, so as to write the initial voltage Vi into a pixel circuit in an $h^{th}$ row and the second column and a pixel circuit in the $h^{th}$ row and the fifth column.

At the pre-charging stage S20, M2 and M5 are turned off.

An interval time period X0 is arranged between the initial time period S0 and the first charging time period S1.

As shown in FIG. 4, the multiplexing sub-circuit in FIG. 3 operates in the $h^{th}$ driving period Th as follows.

Within the initial time period S0, U2 and U5 each applies a low voltage signal, so as to turn on M2 and M5. U1, U3, U4 and U6 each applies a high voltage signal, so as to turn off M1, M3, M4 and M6. The source driver applies the initial voltage Vi via J1, writes Vi to D2 via the turned-on M2, so as to charge a parasitic capacitance of D2 via Vi, and writes Vi to D5 via the turned-on M5, so as to charge a parasitic capacitance of D5 via Vi. Hence, the same initial voltage Vi is written into D2 and D5, so as to clear a residual grey-scale voltage within a previous row.

Within the interval time period X0, U2 and U5 each applies a high voltage signal, so as to control M2 and M5 to be switched from an ON state to an OFF state.

Within the initial time period S0, the interval time period X0 and the first charging time period S1, the gate driving signal outputs a high voltage signal to the $h^{th}$ gate line Gh, so as to turn off the $h^{th}$ gate line Gh.

At the first one of the first charging stages S11, U3 applies a low voltage signal, and M3 is turned on. U1, U2, U4, U5 and U6 each applies a high voltage signal, M1, M2, M4, M5 and M6 are turned off. The source driver applies a first one of the first grey-scale voltages to D3 via J1, and charges a parasitic capacitance of D3 via the first one of the first grey-scale voltages, so as to store the first one of the first grey-scale voltages in the parasitic capacitance of D3.

At the first one of the first interval stages X2, U3 applies a high voltage signal, and M3 is switched from an on state to an off state.

At the second one of the first charging stages S12, U6 applies a low voltage signal, M6 is turned on. U1, U2, U3, U4 and U5 each applies a high voltage signal, M1, M2, M3, M4 and M5 are turned off. The source driver applies a second one of the first grey-scale voltages to D6 via J1, and charges a parasitic capacitance of D6 via the second one of the first grey-scale voltages, so as to store the second one of the first grey-scale voltages in the parasitic capacitance of D6.

At the second one of the first interval stages X3, U6 applies a high voltage signal, and M6 is switched from an on state to an off state.

At the third one of the first charging stages S13, U1 applies a low voltage signal, and M1 is turned on. U2, U3, U4, U5 and U6 each applies a high voltage signal, and M2, M3, M4, M5 and M6 are turned off. The source driver applies a third one of the first grey-scale voltages to D1 via J1, and charges a parasitic capacitance of D1 via the third one of the first grey-scale voltages, so as to store the third one of the first grey-scale voltages in the parasitic capacitance of D1.

At the third one of the first interval stages X4, U1 applies a high voltage signal, and M1 is switched from an on state to an off state.

At the fourth one of the first charging stages S14, U4 applies a low voltage signal, and M4 is turned on. U1, U2, U3, U5 and U6 each applies a high voltage signal, and M1, M2, M3, M5 and M6 are turned off. The source driver applies a fourth one of the first grey-scale voltages to D4 via J1, and charges a parasitic capacitance of D4 via the fourth one of the first grey-scale voltages, so as to store the fourth one of the first grey-scale voltages in the parasitic capacitance of D4.

At the charging-interval time period X10, M4 is in a total off state, and a signal from the gate driving circuit to Gh is switched from the high voltage signal to a low voltage signal, so as to enable the $h^{th}$ gate line Gh to be switched from an off state to an on state. At the second charging time period S2, the gate driving circuit applies the low voltage signal to Gh, and the $h^{th}$ gate line Gh is turned on. A parasitic capacitance of Dq is connected in parallel with a pixel storage capacitance in a pixel circuit in the $h^{th}$ row and a CO column, and thereby charges the pixel storage capacitance of the pixel circuit in the $h^{th}$ row and the CO column, so as to write the corresponding first grey-scale voltage to the pixel storage capacitance of the pixel circuit in the $h^{th}$ row and the CO column, where q is 1, 3, 4 or 6. The first grey-scale voltage corresponding to D1 is the third one of the first grey-scale voltages, the first grey-scale voltage corresponding to D3 is the first one of the first grey-scale voltages, the first grey-scale voltage corresponding to D4 is the fourth one of the first grey-scale voltages, and the first grey-scale voltage corresponding to D6 is the second one of the first grey-scale voltages.

At the pre-charging stage S20, the gate driving circuit applies a low voltage signal to Gh, and the $h^{th}$ gate line Gh is turned on. U1, U2, U3, U4, U5 and U6 each applies a high voltage signal, and M1, M2, M3, M4, M5 and M6 are turned off. The parasitic capacitance of D2 is connected in parallel with the pixel storage capacitance of the pixel circuit in the $h^{th}$ row and the second column, and thereby charges the pixel storage capacitance of the pixel circuit in the $h^{th}$ row and the second column via the initial voltage Vi, so as to write Vi to the pixel storage capacitance of the pixel circuit in the $h^{th}$ row and the second column. The parasitic capacitance of D5 is connected in parallel with the pixel storage capacitance of the pixel circuit in the $h^{th}$ row and the fifth column, and thereby charges the pixel storage capacitance of the pixel circuit in the $h^{th}$ row and the fifth column via the initial voltage Vi, so as to write Vi to the pixel storage capacitance of the pixel circuit in the $h^{th}$ row and the fifth column.

At the first one of the second charging stages S21, the gate driving circuit applies a low voltage signal to Gh, and the $h^{th}$ gate line is turned on. U2 applies a low voltage signal, and M2 is turned on. U1, U3, U4, U5 and U6 each applies a high voltage signal, and M1, M3, M4, M5 and M6 are turned off. The source driver applies a first one of the second grey-scale voltages to D2 via J1, so as to charge the pixel storage capacitance of the pixel circuit in the $h^{th}$ row and the second column via the first one of the second grey-scale voltages, thereby to write the first one of the second grey-scale voltages to the pixel circuit in the $h^{th}$ row and the second column.

At the first one of the second interval stages X1, the voltage from the source driver via J1 is switched from the first one of the second grey-scale voltages to a second one of the second grey-scale voltages, and M1, M2, M3, M4, M5 and M6 are turned off.

At the second one of the second charging stages S22, the gate driving circuit applies a low voltage signal to Gh, and the $h^{th}$ gate line is turned on. U5 applies a low voltage signal, and M5 is turned on. U1, U2, U3, U4 and U6 each applies a high voltage signal, and M1, M2, M3, M4 and M6 are turned off. The source driver applies the second one of the second grey-scale voltages to D5 via J1, so as to charge the pixel storage capacitance of the pixel circuit in the $h^{th}$ row and the fifth column via the second one of the second grey-scale voltages, thereby to write the second one of the second grey-scale voltages to the pixel circuit in the $h^{th}$ row and the fifth column.

At the second charging end stage S23, the gate driving circuit applies a low voltage signal to Gh, the $h^{th}$ gate line is turned on, U5 applies a high voltage signal, and M5 is switched into a total off state.

After M5 is in the total off state, the second charging time period S2 ends, and a next driving period begins (in FIG. 4, Th+1 denotes a $(h+1)^{th}$ driving period, Gh+1 denotes a $(h+1)^{th}$ gate line, and in a second charging period of the next driving period, the gate driving circuit applies a low voltage signal to Gh+1, so as to turn on Gh+1).

At the second charging end stage S23, the voltage output terminal J1 of the source driver may be, but not limited to, in a floating state.

In FIGS. 3 and 4, the initial voltage Vi may be, but not limited to, −8V.

In FIG. 4, Vd denotes the voltage from the source driver via the voltage output terminal J1.

In FIGS. 3 and 4, duration of X1 may be greater than duration of X2, the duration of X1 may be greater than duration of X3, and the duration of X1 may be greater than duration of X4. Since a rising edge or a falling edge of the voltage from the source driver via J1 is not allowed to occur in the first one of the second charging stages S21 and the second one of the second charging stages S22, the interval time period between S21 and S22 is relatively larger, so as to avoid a display chromatic aberration. Thus, the duration of each first charging stage is greater than the duration of each second charging stage.

In FIGS. 3 and 4, the duration of the charging-interval time period X10 is determined when it is ensured that M4 is switched into a total off state during the charging-interval time period X10, and the $h^{th}$ gate line Gh is in a total on state. After that, the first one of the second charging stages in the second charging time period begins.

In FIGS. 3 and 4, the duration of the second charging end stage S23 is determined when it is ensured that M5 is in a total off state. Next, the $h^{th}$ gate line in the row is turned off.

The present disclosure provides in some embodiments a multiplexing driving module for a display module. The display module includes a source driver, a gate driving circuit, a multiplexing circuit and a pixel circuit, pixel circuits in a same row are electrically connected to a same gate line, and pixel circuits in a same column are electrically connected to a same data line. The multiplexing circuit includes at least one multiplexing sub-circuit including a plurality of multiplexing switches, a control end of each multiplexing switch in a same multiplexing sub-circuit is electrically connected to a multiplexing control end, a first end of the multiplexing switch is electrically connected to the source driver, a second end of the multiplexing switch is electrically connected to a corresponding data line, and a driving period includes an initial time period, a first charging time period and a second charging time period arranged one after another. In the multiplexing sub-circuit, at least one multiplexing switch serves as a pre-charging multiplexing switch, and the multiplexing control end electrically connected to a control end of the pre-charging multiplexing switch is a pre-charging multiplexing control end. In the multiplexing sub-circuit, the multiplexing switches other than the at least one pre-charging multiplexing switch are non-pre-charging multiplexing switches, and the multiplexing control end electrically connected to a control end of each non-pre-charging multiplexing switch is a non-pre-charging multiplexing control end. The data line electrically connected to the pre-charging multiplexing switch is a pre-charging data line, and the data line electrically connected to each non-pre-charging multiplexing switch is a non-pre-charging data line. The source driver is configured to apply an initial voltage to the pre-charging multiplexing switch within the initial time period, apply a corresponding grey-scale voltage to the non-pre-charging multiplexing switches within the first charging time period, and apply a corresponding grey-scale voltage to pre-charging multiplexing switches within the second charging time period. The gate driving circuit is configured to control a corresponding gate line to be turned on within the second charging time period, so as to write the corresponding grey-scale voltage into the pixel circuits in a row corresponding to the gate line and electrically connected to corresponding non-pre-charging data lines respectively. Within the initial time period, each pre-charging multiplexing switch is turned on under the control of an on control signal from corresponding pre-charging multiplexing control end, so as to write the initial voltage into a corresponding pre-charging data line. within the second charging time period, pre-charging multiplexing switches are turned on under the control of on control signals from corresponding pre-charging multiplexing control ends in a time-division manner, so as to write the corresponding grey-scale voltage into the pixel circuits in a row corresponding to the gate line and electrically connected to the corresponding pre-charging data lines respectively in the time-division manner. Each corresponding pre-charging data line is electrically connected to the turned-on pre-charging multiplexing switch. Within the second charging time period, non-pre-charging multiplexing switchers are turned on under the control of on control signals from corresponding non-pre-charging multiplexing control ends in a time-division manner, so as to write the corresponding grey-scale voltage into the corresponding non-pre-charging data lines in a time-division manner via the turned-on non-pre-charging multiplexing switches.

In the multiplexing sub-circuit, at least one multiplexing switch serves as the pre-charging multiplexing switch, the multiplexing switches other than the at least one pre-charging multiplexing switch are the non-pre-charging multiplexing switches. The driving period may include the initial time period during which each pre-charging multiplexing switch is turned on, and the source driver applies the initial voltage to the pre-charging data line, so as to charge a parasitic capacitance of the pre-charging data line, and write the same initial voltage into each pre-charging data line, thereby to clear a residual grey-scale voltage within a previous row. In addition, in at least one embodiment of the present disclosure, during the initial time period, only the pre-charging multiplexing switch is turned on, the non-pre-charging multiplexing switches are not turned on, a load is low during writing the initial voltage, and thereby a driving time period may be shortened.

In a possible embodiment of the present disclosure, the multiplexing driving module further includes a multiplexing driving control circuit, configured to, within the initial time period, apply the on control signal to the pre-charging multiplexing control end, so as to turn on the pre-charging multiplexing switch, and control the source driver to apply the initial voltage to the pre-charging multiplexing switch, so as to write the initial voltage into the corresponding pre-charging data line via the turned-on pre-charging multiplexing switch; within the first charging time period, apply the on control signals to different non-pre-charging multiplexing control ends in the time-division manner, so as to turn on the different non-pre-charging multiplexing switches in the time-division manner, and control the source driver to apply the corresponding grey-scale voltage to the non-pre-charging multiplexing switches, so as to write the corresponding grey-scale voltage into the corresponding non-pre-charging data lines in the time-division manner via the turned-on non-pre-charging multiplexing switches; and within the second charging time period, control the gate driving circuit to turn on the corresponding gate line, so as to write the corresponding grey-scale voltage into the pixel circuits in the row corresponding to the gate line and electrically connected to the corresponding non-pre-charging data lines respectively, apply the on control signals to different pre-charging multiplexing control ends in the time-division manner, so as to turn on the different pre-charging multiplexing switches in the time-division manner, and control the source driver to apply the corresponding grey-scale voltage to the pre-charging multiplexing switches, so as to write the corresponding grey-scale voltage to the pixel circuits in the row corresponding to the gate line and electrically connected to the corresponding pre-charging data lines respectively in the time-division manner via the turned-on pre-charging multiplexing switches. The corresponding pre-charging data lines are electrically connected to the turned-on pre-charging multiplexing switches.

In the multiplexing driving module according to at least one embodiment of the present disclosure, it is able to improve the utilization rate of the source driver. Within the first charging time period, the multiplexing driving control circuit controls the source driver to write the corresponding grey-scale voltage to different non-pre-charging data lines in the time division manner, and charge the parasitic capacitances of the non-pre-charging data lines, so that when the gate line is turned off, it is able for the source driver to apply the corresponding grey-scale voltage to pixel circuits in the corresponding row and electrically connected to the corresponding pre-charging data lines. As a result, in at least one embodiment of the present disclosure, it is able for the multiplexing driving control circuit to increase a gap between ON time periods of each pre-charging multiplexing switch, and mitigate chromatic aberration. In addition, in at least one embodiment of the present disclosure, it is able to increase the charging rate by combining a passive charging mode with an active charging mode.

The display module includes the source driver, the gate driving circuit, the multiplexing circuit and the pixel circuits, the pixel circuits in the same row are electrically connected to the same gate line, and the pixel circuits in the same column are electrically connected to the same data line.

Figure 5:
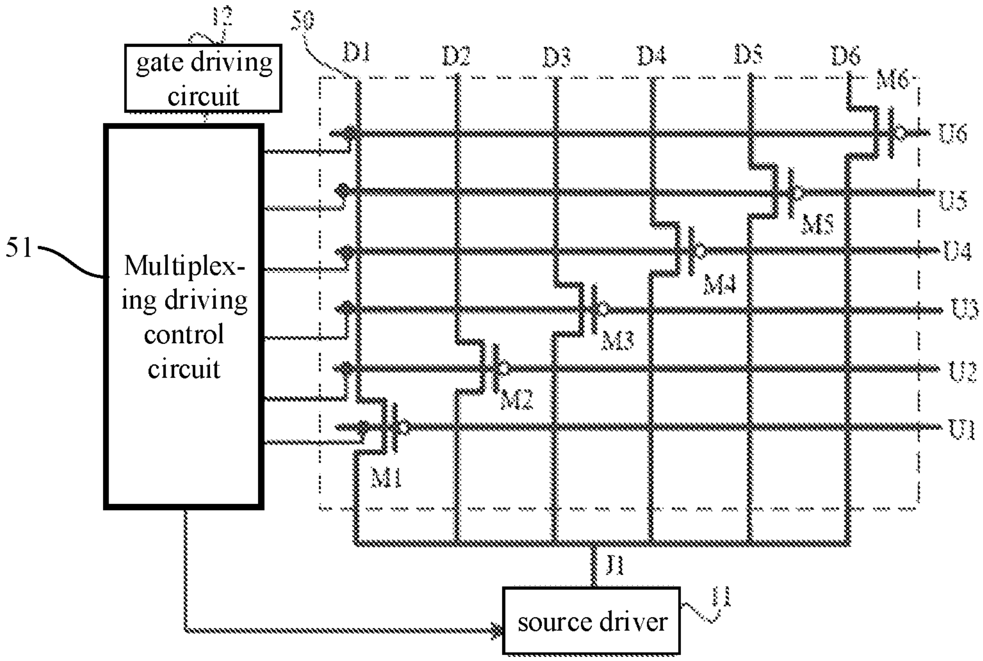
FIG. 5 is a schematic view showing a multiplex driving module according to at least one embodiment of the present disclosure.

A multiplexing sub-circuit 50 in a multiplexing circuit is shown in FIG. 5, and includes a first multiplexing switch transistor M1, a second multiplexing switch transistor M2, a third multiplexing switch transistor M3, a fourth multiplexing switch transistor M4, a fifth multiplexing switch transistor M5 and a sixth multiplexing switch transistor M6.

A gate electrode of Mp is electrically connected to a $p^{th}$ multiplexing control end Up, a source electrode of Mp is electrically connected to the voltage output terminal J1 of the source driver 11, and a drain electrode of Mp is electrically connected to the $p^{th}$ data line Dp, where p is 1, 2, 3, 4, 5 or 6.

In FIG. 5, U1 denotes a first multiplexing control end, U2 denotes a second multiplexing control end, U3 denotes a third multiplexing control end, U4 denotes a fourth multiplexing control end, U5 denotes a fifth multiplexing control end, and U6 denotes a sixth multiplexing control end.

D1 denotes a first data line, D2 denotes a second data line, D3 denotes a third data line, D4 denotes a fourth data line, D5 denotes a fifth data line, and D6 denotes a sixth data line.

As shown in FIG. 5, the multiplexing driving module includes a multiplexing driving control circuit 51.

In the multiplexing sub-circuit 50, M2 and M5 serve as pre-charging multiplexing switches, and U2 and U5 are pre-charging multiplexing control ends. In the multiplexing sub-circuit 50, M1, M3, M4 and M6 are non-pre-charging multiplexing switches, and U1, U3, U4 and U6 are non-pre-charging multiplexing control ends. D2 and D5 are pre-charging data lines, and D1, D3, D4 and D6 are non-pre-charging data lines.

The multiplexing driving control circuit 51 is electrically connected to the source driver 11, the gate driving circuit 12, the first multiplexing control end U1, the second multiplexing control end U2, the third multiplexing control end U3, the fourth multiplexing control end U4, the fifth multiplexing control end U5 and the sixth multiplexing control end U6.

The multiplexing driving control circuit 51 is configured to, within the first charging time period, apply an on control signal to U1, U3, U4 and U6 in a time division manner, so as to turn on M1, M3, M4 and M6 in the time division manner, and control the source driver 11 to apply the corresponding grey-scale voltage to M1, M3, M4 and M6 in the time division manner, so as to write the corresponding grey-scale voltage into D1, D3, D4 and D6 via the turned-on M1, M3, M4 and M6 in the time division manner.

The multiplexing driving control circuit 51 is further configured to, within the second charging time period, control the gate driving circuit 12 to turn on a corresponding gate line, so as to write the corresponding grey-scale voltage to a pixel circuit in the corresponding row and electrically connected to D1, a pixel circuit in the corresponding row and electrically connected to D3, a pixel circuit in the corresponding row and electrically connected to D4, and a pixel circuit in the corresponding row and electrically connected to D6.

The multiplexing driving control circuit 51 is further configured to, within the second charging time period, apply an on control signal to U2 and U5, so as to turn on M2 and M5 in the time-division manner, and control the source driver 11 to apply a corresponding grey-scale voltage to U2 and U5 in the time-division manner, so as to write the corresponding grey-scale voltage to a pixel circuit in the corresponding row and electrically connected to D2 and a pixel circuit in the corresponding row and electrically connected to D5 via the turned-on U2 and U5 in the time-division manner.

A case where the multiplexing circuit includes one multiplexing sub-circuit is shown in FIG. 5, and the structure of the multiplexing sub-circuit is the same as that in FIG. 3. In actual use, the multiplexing circuit may include a plurality of multiplexing sub-circuits. A case where the display module includes one source driver is shown in FIG. 5. In actual use, the display module may include, but not limited to, a plurality of source drivers.

During the implementation, the pixel circuits corresponding to a same color are each electrically connected to the pre-charging multiplexing switch or a non-pre-charging multiplexing switch.

In at least one embodiment of the present disclosure, due to a large difference between the charging rates of the active charging mode and the charging rate of the passive charging mode, the active charging mode or the passive charging mode is used in each of the pixel circuits corresponding to the same color, so as to reduce a difference between charging rates of the pixel circuits corresponding to the same color, thereby to avoid Mura (uneven display) in a vertical direction (a direction where the data line extends).

In the specific implementation, the initial voltage is within a predetermined voltage range.

In a possible embodiment of the present disclosure, in a case that each transistor in the pixel circuit is a p-type transistor, the initial voltage may be much smaller than each grey-scale voltage, or, in a case that each transistor in the pixel circuit is an n-type transistor, the initial voltage may be much greater than each grey-scale voltage, so as to charge each pre-charging data line to be below or above the corresponding grey-scale voltage in an short initial time period as possible, thereby to allocate more time period to the written-in of the grey-scale voltage.

The present disclosure provides in some embodiments a display device including the above-mentioned multiplex driving module.

In a possible embodiment of the present disclosure, the display device further includes the display module. The display module includes the source driver, the gate driving circuit, the multiplexing circuit and the pixel circuits. The pixel circuits in the same row are electrically connected to the same gate line, and the pixel circuits in the same column are electrically connected to the same data line. The gate driving circuit is electrically connected to the gate line, and configured to be controlled by the multiplexing driving control circuit in the multiplexing driving module, so as to apply a corresponding gate driving signal to the gate line. The multiplexing circuit includes at least one multiplexing sub-circuit including the plurality of multiplexing switches, the control end of the multiplexing switch in the same multiplexing sub-circuit is electrically connected to the multiplexing control end, the first end of the multiplexing switch is electrically connected to the source driver, and the second end of the multiplexing switch is electrically connected to the corresponding data line. The source driver is configured to be controlled by the multiplexing driving control circuit, so as to output the corresponding grey-scale voltage.

In the embodiments of the present disclosure, the display device may be any product or member having a display function, e.g., a mobile phone, a flat-panel computer, a television, a display, a laptop computer, a digital photo frame or a navigator.

Unless otherwise defined, any technical or scientific term used herein shall have the common meaning understood by a person of ordinary skills. Such words as "first" and "second" used in the specification and claims are merely used to differentiate different components rather than to represent any order, number or importance. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

It should be appreciated that, in the case that such an element as layer, film, region or substrate is arranged "on" or "under" another element, it may be directly arranged "on" or "under" the other element, or an intermediate element may be arranged therebetween.

In the above description, the features, structures, materials or characteristics may be combined in any embodiment or embodiments in an appropriate manner.

The above embodiments are optional embodiments of the present disclosure, it should be appreciated, those skilled in the art may make various improvements and modifications without departing from the principle of the present disclosure, and theses improvement and modifications shall fall within the protection scope of the present disclosure.

What is claimed is:

1. A multiplexing driving method for a display module, wherein the display module comprises a source driver, a gate driving circuit, a multiplexing circuit and a pixel circuit, pixel circuits in a same row are electrically connected to a same gate line, and pixel circuits in a same column are electrically connected to a same data line; the multiplexing circuit comprises at least one multiplexing sub-circuit comprising a plurality of multiplexing switches, a control end of each multiplexing switch in a same multiplexing sub-circuit is electrically connected to a multiplexing control end, a first end of the multiplexing switch is electrically connected to the source driver, a second end of the multiplexing switch is electrically connected to a corresponding data line, and a driving period comprises an initial time period, a first charging time period and a second charging time period arranged one after another; wherein, in the multiplexing sub-circuit, at least one multiplexing switch serves as a pre-charging multiplexing switch, and the multiplexing control end electrically connected to a control end of the pre-charging multiplexing switch is a pre-charging multiplexing control end; in the multiplexing sub-circuit, the multiplexing switches other than the at least one pre-charging multiplexing switch are non-pre-charging multiplexing switches, and the multiplexing control end electrically connected to a control end of each non-pre-charging multiplexing switch is a non-pre-charging multiplexing control end; the data line electrically connected to the pre-charging multiplexing switch is a pre-charging data line, and the data line electrically connected to each non-pre-charging multiplexing switch is a non-pre-charging data line;

wherein the multiplexing driving method comprises:

within the initial time period, applying an on control signal to the pre-charging multiplexing control end to turn on the pre-charging multiplexing switch, and applying, by the source driver, an initial voltage to the pre-charging multiplexing switch to write the initial voltage into the corresponding pre-charging data line via the turned-on pre-charging multiplexing switch, and applying an off control signal to the non-pre-charging multiplexing control end to turn off the non-pre-charging multiplexing switches;

within the first charging time period, applying an on control signal to different non-pre-charging multiplexing control ends in a time-division manner to turn on the different non-pre-charging multiplexing switches in the time-division manner; and applying, by the source driver, a corresponding grey-scale voltage to the non-pre-charging multiplexing switches to write the corresponding grey-scale voltage into corresponding non-pre-charging data lines in a time-division manner via the turned-on non-pre-charging multiplexing switches, and applying an off control signal to the pre-charging multiplexing control end to turn off the pre-charging multiplexing switches; and within the second charging time period, controlling, by the gate driving circuit, a corresponding gate line to be turned on, to write the corresponding grey-scale voltage into the pixel circuits in a row corresponding to the gate line and electrically connected to the corresponding non-pre-charging data lines respectively; applying an on control signal to different pre-charging multiplexing control ends in a time-division manner to turn on the different pre-charging multiplexing switches in the time-division manner; applying an off control signal to the non-pre-charging multiplexing control end to turn off the non-pre-charging multiplexing switches; applying, by the source driver, a corresponding grey-scale voltage to the pre-charging multiplexing switches to write the corresponding grey-scale voltage to the pixel circuits in a row corresponding to the gate line and electrically connected to the corresponding pre-charging data lines respectively in a time-division manner via the turned-on pre-charging multiplexing switches; wherein each corresponding pre-charging data line is electrically connected to the turned-on pre-charging multiplexing switch.

2. The multiplexing driving method according to claim 1, wherein the pixel circuits corresponding to a same color are each electrically connected to the pre-charging multiplexing switch or a non-pre-charging multiplexing switch.

3. The multiplexing driving method according to claim 1, wherein the second charging time period comprises a pre-charging stage and N second charging stages arranged one after another, and the multiplexing driving method further comprises:

at the pre-charging stage, controlling, by the gate driving circuit, the corresponding gate line to be turned on, to write the initial voltage to the pixel circuits in the row corresponding to the gate line and electrically connected to the corresponding pre-charging data lines respectively; wherein, at the pre-charging stage, the pre-charging multiplexing switches are turned off; and at an $n^{th}$ one of the second charging stages, controlling, by the gate driving circuit, the corresponding gate line to be turned on, and turning on an $n^{th}$ pre-charging multiplexing switch;

where N is a positive integer and n is a positive integer smaller than or equal to N.

4. The multiplexing driving method according to claim 1, wherein in a case that a transistor in the pixel circuit is a p-type transistor, the initial voltage is smaller than a minimum grey-scale voltage from the source driver; and in a case that a transistor in the pixel circuit is an n-type transistor, the initial voltage is greater than a maximum grey-scale voltage from the source driver.

5. The multiplexing driving method according to claim 1, wherein the second charging time period comprises N second charging stages arranged one after another, where N is a positive integer, and the multiplexing driving method further comprises:

at an $n^{th}$ one of the second charging stages, applying an on control signal to an $n^{th}$ pre-charging multiplexing control end to turn on an $n^{th}$ pre-charging multiplexing switch, and applying, by the source driver, an $n^{th}$ one of second grey-scale voltages to the $n^{th}$ pre-charging multiplexing switch, to write the $n^{th}$ one of the second grey-scale voltages to a pixel circuit in the row corresponding to the gate line and electrically connected to an $n^{th}$ pre-charging data line via the $n^{th}$ pre-charging multiplexing switch; wherein the $n^{th}$ pre-charging data line is electrically connected to the $n^{th}$ pre-charging multiplexing switch, where n is a positive integer smaller than or equal to N, and the $n^{th}$ pre-charging multiplexing switch is electrically connected to the $n^{th}$ pre-charging multiplexing control end.

6. The multiplexing driving method according to claim 5, wherein N is the positive integer greater than 1, an $m^{th}$ one of second interval stages is arranged between an $m^{th}$ one of the second charging stages and a $(m+1)^{th}$ one of the second charging stages in the second charging time period, where m is a positive integer less than N, and duration of the $m^{th}$ one of the second interval stages is greater than a first predetermined time period, to enable a voltage from the source driver to be switched from an $m^{th}$ one of second grey-scale voltages to an $(m+1)^{th}$ one of the second grey-scale voltages during the $m^{th}$ one of the second interval stages.

7. The multiplexing driving method according to claim 5, wherein the second charging time period comprises a second charging end stage arranged after an $N^{th}$ one of the second charging stages, and the multiplexing driving method further comprises: at the second charging end stage, enabling an $N^{th}$ pre-charging multiplexing switch to be in a total OFF state.

8. The multiplexing driving method according to claim 5, wherein the first charging time period comprises A first charging stages, where A is a positive integer, and the multiplexing driving method further comprises:

at an $a^{th}$ one of the first charging stages, applying an on control signal to an $a^{th}$ non-pre-charging multiplexing control end, to turn on an $a^{th}$ non-pre-charging multiplexing switch, and applying, by the source driver, an $a^{th}$ one of first grey-scale voltages to the $a^{th}$ non-pre-charging multiplexing switch, to write the $a^{th}$ one of the first grey-scale voltages into an $a^{th}$ non-pre-charging data line via the $a^{th}$ non-pre-charging multiplexing switch; wherein the $a^{th}$ non-pre-charging data line is electrically connected to the $a^{th}$ non-pre-charging multiplexing switch, where a is a positive integer smaller than or equal to A, and the $a^{th}$ non-pre-charging multiplexing switch is electrically connected to the $a^{th}$ non-pre-charging multiplexing control end.

9. The multiplexing driving method according to claim 8, wherein duration of each first charging stage is greater than a second predetermined time period.

10. The multiplexing driving method according to claim 8, wherein a charging-interval time period is arranged from a time point where an $A^{th}$ one of the first charging stages in the first charging time period ends to a time point where a first one of the second charging stages in the second charging time period begins, and the multiplexing driving method further comprises:

within the charging-interval time period, enabling an $A^{th}$ non-pre-charging multiplexing switch to be in a total OFF state, and turning on the corresponding gate line.

11. The multiplexing driving method according to claim 8, wherein duration of each first charging stage is greater than duration of each second charging stage.

12. A multiplexing driving module for a display module, wherein the display module comprises a source driver, a gate driving circuit, a multiplexing circuit and a pixel circuit, pixel circuits in a same row are electrically connected to a same gate line, and pixel circuits in a same column are electrically connected to a same data line; the multiplexing circuit comprises at least one multiplexing sub-circuit comprising a plurality of multiplexing switches, a control end of each multiplexing switch in a same multiplexing sub-circuit is electrically connected to a multiplexing control end, a first end of the multiplexing switch is electrically connected to the source driver, a second end of the multiplexing switch is electrically connected to a corresponding data line, and a driving period comprises an initial time period, a first charging time period and a second charging time period arranged one after another;

in the multiplexing sub-circuit, at least one multiplexing switch serves as a pre-charging multiplexing switch, and the multiplexing control end electrically connected to a control end of the pre-charging multiplexing switch is a pre-charging multiplexing control end; in the multiplexing sub-circuit, the multiplexing switches other than the at least one pre-charging multiplexing switch are non-pre-charging multiplexing switches, and the multiplexing control end electrically connected to a control end of each non-pre-charging multiplexing switch is a non-pre-charging multiplexing control end; the data line electrically connected to the pre-charging multiplexing switch is a pre-charging data line, and the data line electrically connected to each non-pre-charging multiplexing switch is a non-pre-charging data line;

the source driver is configured to apply an initial voltage to the pre-charging multiplexing switch and apply an off control signal to the non-pre-charging multiplexing control end to turn off the non-pre-charging multiplexing switches within the initial time period, apply a corresponding grey-scale voltage to the non-pre-charging multiplexing switches and apply an off control signal to the pre-charging multiplexing control end to turn off the pre-charging multiplexing switches within the first charging time period, and apply a corresponding grey-scale voltage to pre-charging multiplexing switches and apply an off control signal to the non-pre-charging multiplexing control end to turn off the non-pre-charging multiplexing switches within the second charging time period;

the gate driving circuit is configured to control a corresponding gate line to be turned on within the second charging time period, so as to write the corresponding grey-scale voltage into the pixel circuits in a row corresponding to the gate line and electrically connected to corresponding non-pre-charging data lines respectively;

within the initial time period, each pre-charging multiplexing switch is turned on under the control of an on control signal from corresponding pre-charging multiplexing control end, so as to write the initial voltage into a corresponding pre-charging data line; within the second charging time period, pre-charging multiplexing switches are turned on under the control of on control signals from corresponding pre-charging multiplexing control ends in a time-division manner, so as to write the corresponding grey-scale voltage into the pixel circuits in a row corresponding to the gate line and electrically connected to the corresponding pre-charging data lines respectively in the time-division manner; and each corresponding pre-charging data line is electrically connected to the turned-on pre-charging multiplexing switch; and within the second charging time period, non-pre-charging multiplexing switchers are turned on under the control of on control signals from corresponding non-pre-charging multiplexing control ends in a time-division manner, so as to write the corresponding grey-scale voltage into the corresponding non-pre-charging data lines in a time-division manner via the turned-on non-pre-charging multiplexing switches.

13. The multiplexing driving module according to claim 12, further comprising a multiplexing driving control circuit, configured to, within the initial time period, apply the on control signal to the pre-charging multiplexing control end, so as to turn on the pre-charging multiplexing switch, and control the source driver to apply the initial voltage to the pre-charging multiplexing switch, so as to write the initial voltage into the corresponding pre-charging data line via the turned-on pre-charging multiplexing switch;

within the first charging time period, apply the on control signals to different non-pre-charging multiplexing control ends in the time-division manner, so as to turn on the different non-pre-charging multiplexing switches in the time-division manner, and control the source driver to apply the corresponding grey-scale voltage to the non-pre-charging multiplexing switches, so as to write the corresponding grey-scale voltage into the corresponding non-pre-charging data lines in the time-division manner via the turned-on non-pre-charging multiplexing switches; and within the second charging time period, control the gate driving circuit to turn on the corresponding gate line, so as to write the corresponding grey-scale voltage into the pixel circuits in the row corresponding to the gate line and electrically connected to the corresponding non-pre-charging data lines respectively, apply the on control signals to different pre-charging multiplexing control ends in the time-division manner, so as to turn on the different pre-charging multiplexing switches in the time-division manner, and control the source driver to apply the corresponding grey-scale voltage to the pre-charging multiplexing switches, so as to write the corresponding grey-scale voltage to the pixel circuits in the row corresponding to the gate line and electrically connected to the corresponding pre-charging data lines respectively in the time-division manner via the turned-on pre-charging multiplexing switches.

14. The multiplexing driving module according to claim 12, wherein the pixel circuits corresponding to a same color are each electrically connected to the pre-charging multiplexing switch or a non-pre-charging multiplexing switch.

15. The multiplexing driving module according to claim 12, wherein in a case that a transistor in the pixel circuit is a p-type transistor, the initial voltage is smaller than a minimum grey-scale voltage from the source driver; and in a case that a transistor in the pixel circuit is an n-type transistor, the initial voltage is greater than a maximum grey-scale voltage from the source driver.

16. A display device, comprising the multiplex driving module according to claim 12.

17. The display device according to claim 16, further comprising the display module, wherein the display module comprises the source driver, the gate driving circuit, the multiplexing circuit and the pixel circuits;

the pixel circuits in the same row are electrically connected to the same gate line, and the pixel circuits in the same column are electrically connected to the same data line;

the gate driving circuit is electrically connected to the gate line, and configured to be controlled by the multiplexing driving control circuit in the multiplexing driving module, so as to apply a corresponding gate driving signal to the gate line;

the multiplexing circuit comprises at least one multiplexing sub-circuit comprising the plurality of multiplexing switches, the control end of the multiplexing switch in the same multiplexing sub-circuit is electrically connected to the multiplexing control end, the first end of the multiplexing switch is electrically connected to the source driver, and the second end of the multiplexing switch is electrically connected to the corresponding data line; and the source driver is configured to be controlled by the multiplexing driving control circuit, so as to output the corresponding grey-scale voltage.

18. The display device according to claim 16, the multiplexing driving module further comprises a multiplexing driving control circuit, configured to, within the initial time period, apply the on control signal to the pre-charging multiplexing control end, so as to turn on the pre-charging multiplexing switch, and control the source driver to apply the initial voltage to the pre-charging multiplexing switch, so as to write the initial voltage into the corresponding pre-charging data line via the turned-on pre-charging multiplexing switch;

within the first charging time period, apply the on control signals to different non-pre-charging multiplexing control ends in the time-division manner, so as to turn on the different non-pre-charging multiplexing switches in the time-division manner, and control the source driver to apply the corresponding grey-scale voltage to the non-pre-charging multiplexing switches, so as to write the corresponding grey-scale voltage into the corresponding non-pre-charging data lines in the time-division manner via the turned-on non-pre-charging multiplexing switches; and within the second charging time period, control the gate driving circuit to turn on the corresponding gate line, so as to write the corresponding grey-scale voltage into the pixel circuits in the row corresponding to the gate line and electrically connected to the corresponding non-pre-charging data lines respectively, apply the on control signals to different pre-charging multiplexing control ends in the time-division manner, so as to turn on the different pre-charging multiplexing switches in the time-division manner, and control the source driver to apply the corresponding grey-scale voltage to the pre-charging multiplexing switches, so as to write the corresponding grey-scale voltage to the pixel circuits in the row corresponding to the gate line and electrically connected to the corresponding pre-charging data lines respectively in the time-division manner via the turned-on pre-charging multiplexing switches.

19. The display device according to claim 16, wherein the pixel circuits corresponding to a same color are each electrically connected to the pre-charging multiplexing switch or a non-pre-charging multiplexing switch.

20. The display device according to claim 16, wherein in a case that a transistor in the pixel circuit is a p-type transistor, the initial voltage is smaller than a minimum grey-scale voltage from the source driver; and in a case that a transistor in the pixel circuit is an n-type transistor, the initial voltage is greater than a maximum grey-scale voltage from the source driver.

* * * * *